(12) United States Patent
Au Yeung et al.

(10) Patent No.: US 11,442,141 B2
(45) Date of Patent: Sep. 13, 2022

(54) SYSTEMS AND METHODS FOR DETECTING, MONITORING, AND MITIGATING THE PRESENCE OF A DRONE

(71) Applicant: SkySafe, Inc., San Diego, CA (US)

(72) Inventors: Chun Kin Au Yeung, San Diego, CA (US); Brandon Lo, San Diego, CA (US); Scott Torborg, San Diego, CA (US)

(73) Assignee: SkySafe, Inc., San Diego, CA (US)

( * ) Notice: Subject to any disclaimer, the term of this patent is extended or adjusted under 35 U.S.C. 154(b) by 87 days.

(21) Appl. No.: 16/871,713

(22) Filed: May 11, 2020

(65) Prior Publication Data

US 2020/0355786 A1 Nov. 12, 2020

Related U.S. Application Data

(60) Provisional application No. 62/846,680, filed on May 12, 2019.

(51) Int. Cl.
*G01S 7/02* (2006.01)
*H04L 5/00* (2006.01)
(Continued)

(52) U.S. Cl.
CPC .......... *G01S 7/021* (2013.01); *H04J 13/0062* (2013.01); *H04L 5/0007* (2013.01); *B64C 39/024* (2013.01)

(58) Field of Classification Search
None
See application file for complete search history.

(56) References Cited

U.S. PATENT DOCUMENTS 5,345,539 A * 9/1994 Webb ...................... G01S 7/417
706/24
7,173,958 B2 2/2007 Ho
(Continued)

FOREIGN PATENT DOCUMENTS

| EP | 3422038 A1 | 1/2019 |
|---|---|---|
| WO | WO 2018/125686 A2 | 7/2018 |
| WO | WO 2019/032162 A2 | 2/2019 |

OTHER PUBLICATIONS

Simon et al., "On the Implementation and Performance of Single and Double Differential Detection Schemes", IEEE Transactions on Communications, IEEE Service Center, Piscataway, NJ. USA, vol. 40, No. 2, Feb. 1, 1992 (Feb. 1, 1992), pp. 278-291.
(Continued)

*Primary Examiner* — Kenny S Lin
(74) *Attorney, Agent, or Firm* — Knobbe Martens Olson & Bear, LLP

(57) ABSTRACT

Systems and methods for detecting, monitoring, and mitigating the presence of a drone are provided herein. In one aspect, a system for detecting presence of a drone includes a radio-frequency (RF) receiver configured to receive an RF signal transmitted between a drone and a controller. The RF signal includes a synchronization signal for synchronization of the RF signal. The system can further include a processor and a computer-readable memory in communication with the processor and having stored thereon computer-executable instructions to cause the at least one processor to receive a sequence of samples from the RF receiver, obtain a double differential of the received sequence of samples, calculate a running sum of a defined number of the double differential of the received sequence of samples, and detect the presence of the drone based on the running sum.

16 Claims, 10 Drawing Sheets

(51) Int. Cl.
*H04J 13/00* (2011.01)
*B64C 39/02* (2006.01)

(56) References Cited

U.S. PATENT DOCUMENTS

| | | | |
|---|---|---|---|
| 9,275,645 | B2 | 3/2016 | Hearing et al. |
| 9,529,360 | B1 | 12/2016 | Melamed et al. |
| 9,763,177 | B1 | 9/2017 | Baskaran et al. |
| 9,847,035 | B1* | 12/2017 | Melamed ............. G01R 29/10 |
| 9,996,079 | B2 | 6/2018 | Magy et al. |
| 10,051,475 | B2 | 8/2018 | Shattil et al. |
| 10,237,743 | B2 | 3/2019 | Shattil et al. |
| 10,271,233 | B2 | 4/2019 | Kleinbeck et al. |
| 10,317,506 | B2 | 6/2019 | Seeber et al. |
| 2002/0176385 | A1 | 11/2002 | Huh |
| 2006/0071671 | A1* | 4/2006 | Tola ..................... G01D 5/2497 324/662 |
| 2009/0118875 | A1* | 5/2009 | Stroud .................. G05D 1/104 701/1 |
| 2014/0349666 | A1* | 11/2014 | Sun ......................... H04L 7/00 455/452.1 |
| 2017/0214429 | A1* | 7/2017 | Eistein .................. H04J 11/004 |
| 2017/0295551 | A1* | 10/2017 | Sadiq .................. H04L 27/2692 |
| 2018/0017665 | A1* | 1/2018 | Wittenberg ............ G01S 7/021 |
| 2018/0262900 | A1* | 9/2018 | Moon .................. H04J 11/0073 |
| 2019/0103030 | A1 | 4/2019 | Banga et al. |
| 2019/0268036 | A1 | 8/2019 | Macleod |
| 2020/0068516 | A1* | 2/2020 | Ma ...................... G05D 1/0016 |
| 2020/0382156 | A1 | 12/2020 | Lo et al. |

OTHER PUBLICATIONS

International Preliminary Report on Patentability issued in application No. PCT/US2020/032391, dated Jul. 19, 2021.
"FCC Part 15.247 Test Report for GL300A (FCC ID:SS3-GL3001501)," Tech. Rep., Apr. 2015. [Online]. Available: https://fccid.io/SS3-GL3001501/Test-Report/Test-Report-Rev-2599009.
"FCC Part 15.247 Test Report for GL300C (FCC ID: SS3-GL3001510)," Tech. Rep., Oct. 2015. [Online]. Available: https://fccid.io/SS3-GL3001510/RF-Exposure-Info/SAR-Test-Report-2805129.
"FCC Part 15.247 Test Report for GL300F (FCC ID:SS3-GL300F1609)," Tech. Rep., Sep. 2016. [Online]. Available: https://fccid.io/SS3-GL300F1609/Test-Report/Test-Report-3155813.
Angelosante et al., "Estimating multiple frequency-hopping signal parameters via sparse linear regression," IEEE Transactions on Signal Processing, vol. 58, No. 10, pp. 5044-5056, Oct. 2010.
Federal Aviation Administration, "FAA aerospace forecasts fiscal years 2019-2039," 2019. [Online]. Available: https://www.faa.gov/data research/aviation/aerospace forecasts/.
Fischler et al., "Random sample consensus: A paradigm for model fitting with applications to image analysis and automated cartography," Communications of the ACM, vol. 24, No. 6, pp. 381-395, Jun. 1981.
Liu et al., "Joint hop timing and frequency estimation for collision resolution in FH networks," IEEE Transactions on Wireless Communications, vol. 4, No. 6, pp. 3063-3074, Nov. 2005.
Lo, et al., "HopSAC: Frequency Hopping Parameter estimation Based on Random Sample Consensus for Counter-Unmanned Aircraft Systems", MILCOM 2019—2019 IEEE Military Communications Conference (MILCOM), IEEE Nov. 12, 2019, pp. 355-360.
Wang et al., "Frequency-hopping signal parameters estimation based on orthogonal matching pursuit and sparse linear regression," IEEE Access, vol. 6, pp. 54 310-54 319, Sep. 2018.
Zhao et al., "Robust frequency-hopping spectrum estimation based on sparse bayesian method," IEEE Transactions on Wireless Communications, vol. 14, No. 2, pp. 781-793, Feb. 2015.
International Search Report dated Sep. 8, 2020, issued in corresponding International Application No. PCT/US2020/034969, filed May 28, 2020.
Mohebbi, Ali, et al., Novel Coarse Timing Synchronization Methods in OFDM Systems Using Fourth Order Statistics, IEEE Transactions on Vehicular Technology, vol. 64, No. 5, May 2015.
Second Written Opinion dated Apr. 19, 2021, issued in corresponding international application No. PCT/US2020/032319, filed May 11, 2020.
International Search Report dated Feb. 2, 2021, issued in International Application No. PCT/US2020/055944, filed Oct. 16, 2021.
International Search Report and Written Opinion issued in application No. PCT/US2021/031801, dated Aug. 17, 2021.
Beyme et al. "Efficient Computation of DFT of Zadoff-Chu sequences," Elec. Letters (2009) vol. 45, No. 9, pp. 461-463.
"Drone Market is Estimated To Expand At a Healthy CAGR in the Upcoming Forecast 2025," [Online] Sep. 13, 2019 https://www.americanewshour.com/?s=Drone+Market+Is+Estimated+To+Expand+At+a+Healthy+CAGR+in+the+Upcoming+Forecast+2025.
"Evolved Universal Terrestrial Radio Access (E-UTRA); Physical Channels and Modulation," 3GPP TS 36.211 (2018) vol. 15.0.
Gul et al. "Timing and Frequency Synchronization for OFDM Downlink Transmissions Using Zadoff-Chu Sequences," IEEE Trans. On Wireless Comm. (2015) vol. 14, No. 3, pp. 1716-1729.
International Search Report dated Jul. 14, 2020, issued in corresponding International Application No. PCT/US2020/032391, filed May 11, 2020.
Kim et al. "A delay-robust random access preamble detection algorithm for LTE system," Proc. RWS (2012) pp. 7578.
Liang et al. "The Research on Random Access Signal Detection Algorithm in LTE Systems," 2013 5th IEEE Intl. Symp. On Microwave, Ant. Prop. And EMC Tech. for Wireless Comm. (2013) pp. 115118.
Nelson et al. "The View From Above: A Survey of the Public's Perception of Unmanned Aerial Vehicles and Privacy," J. of Urban Tech. (2019) vol. 26, issue 1, pp. 83-105.
Tao et al. "Improved Zadoff-Chu Sequence Detection in the Presence of Unknown Multipath and Carrier Frequency Offset," IEEE Comm. Letters (2019) vol. 22, No. 5, pp. 922-925.
Yu et al. "Random access algorithm of LTE TDD system based on frequency domain detection," Proc. Int. Conf. Semantics, Knowl. Grid (2009) pp. 346350.

* cited by examiner

107

| ZC SEQUENCE 201 | DATA PACKET 202 | DATA PACKET 203 | DATA PACKET 204 | DATA PACKET 205 | DATA PACKET 206 |

| SAMPLE 211 | SAMPLE 212 | SAMPLE 213 | SAMPLE 214 | SAMPLE 214 | SAMPLE 215 |

FIG. 2E

SYSTEMS AND METHODS FOR DETECTING, MONITORING, AND MITIGATING THE PRESENCE OF A DRONE

CROSS-REFERENCE TO RELATED APPLICATION(S)

This application claims the benefit of U.S. Provisional Application No. 62/846,680, filed May 12, 2019, which is hereby incorporated by reference in its entirety.

BACKGROUND

Technological Field

The systems and methods disclosed herein are directed to detecting, monitoring, and mitigating the presence of a drone. More particularly, the systems and methods detect a radio-frequency (RF) signal transmitted between the drone and a drone controller.

Description of the Related Technology

In recent years, Unmanned Aircraft Systems (UAS), more commonly known as drones, have been used extensively in a large number of exciting and creative applications, ranging from aerial photography, agriculture, product delivery, infrastructure inspection, aerial light shows, and hobbyist drone racing. Despite the usefulness of drones in many applications they also pose increasing security, safety, and privacy concerns. Drones are being used to smuggle weapons and drugs across borders. The use of drones near airports presents safety concerns, which may require airports to shut down until the surrounding airspace is secured. Drones are also used as a tool of corporate and state espionage activities. Thus, there is demand for an effective Counter-Unmanned Aircraft System (CUAS) solution to detect and monitor drones and mitigate the threat of drones when necessary.

SUMMARY

The systems, methods and devices of this disclosure each have several innovative aspects, no single one of which is solely responsible for the desirable attributes disclosed herein.

In one aspect, there is provided a system for detecting presence of a drone, the system comprising: a radio-frequency (RF) receiver configured to receive an RF signal transmitted between a drone and a controller, the RF signal including a synchronization signal for synchronization of the RF signal; at least one processor; and a computer-readable memory in communication with the at least one processor and having stored thereon computer-executable instructions to cause the at least one processor to: receive a sequence of samples from the RF receiver, obtain a double differential of the received sequence of samples, calculate a running sum of a defined number of the double differential of the received sequence of samples, and detect the presence of the drone based on the running sum.

In another aspect, there is provided a method for detecting presence of a drone, the method comprising: receiving a sequence of samples of an RF signal transmitted between a drone and a controller, the RF signal including a synchronization signal for synchronization of the RF signal; obtaining a double differential of the received sequence of samples; calculating a running sum of a defined number of the double differential of the received sequence of samples; and detecting the presence of the drone based on the running sum.

In yet another aspect, there is provided a non-transitory computer readable storage medium having stored thereon instructions that, when executed, cause a computing device to: receive a sequence of samples of an RF signal transmitted between a drone and a controller, the RF signal including a synchronization signal for synchronization of the RF signal; obtain a double differential of the received sequence of samples; calculate a running sum of a defined number of the double differential of the received sequence of samples; and detect the presence of the drone based on the running sum.

BRIEF DESCRIPTION OF THE DRAWINGS

FIG. 2D illustrates an example RF signal from FIG. 1 that can be sent from the controller of FIG. 2C to the drone of FIG. 2B or vice versa.

FIG. 2E illustrates an example signal that the drone detection system from FIG. 2A receives as a result of eavesdropping on the RF signal from FIG. 2D transmitted between the controller and the drone.

DETAILED DESCRIPTION

The fast growth of drone applications in industrial, commercial and consumer domains in recent years has caused great security, safety and privacy concerns. For this reason, demand has been growing for systems and technique for drone detection, monitoring, and mitigation.

CUAS systems (or simply "drone detection systems") may operate using multiple stages. In a first stage, the drone detection system detects the presence of a drone and determine whether the drone is a friend or a foe. The drone detection system can accomplish this by eavesdropping the signals exchanged between the drone and the controller. For example, certain aspects of this disclosure may relate to detecting the presence of drones which communicate with the controller using an RF signal including a synchronization signal such as a Zadoff-Chu (ZC) sequence for synchronization of the RF signal.

In certain aspect, the detection of the drone can involve receiving a sequence of samples of an RF signal transmitted between a drone and a drone controller, the RF signal including a synchronization signal for synchronization of the RF signal, obtaining a double differential of the received sequence of samples, calculating a running sum of a defined number of the double differential of the received sequence of samples, and detecting the presence of the drone based on the running sum.

For certain types of synchronization signals (e.g., ZC sequences), by detecting the presence of a drone employing a synchronization signal as described herein, the drone detection system can detect the synchronization signal without knowledge of a root of the synchronization signal. As used herein, the root of these types of synchronization signals generally refers to a unique value that is used to generate and decode the synchronization signals. The use of a unique root can prevent the synchronization signal from interfering with other RF communication signals generated using a different root. Moreover, the drone detection system can be implemented with low-complexity and can be cost effective compared to techniques which run detection in parallel using every possible root value.

Figure 1:
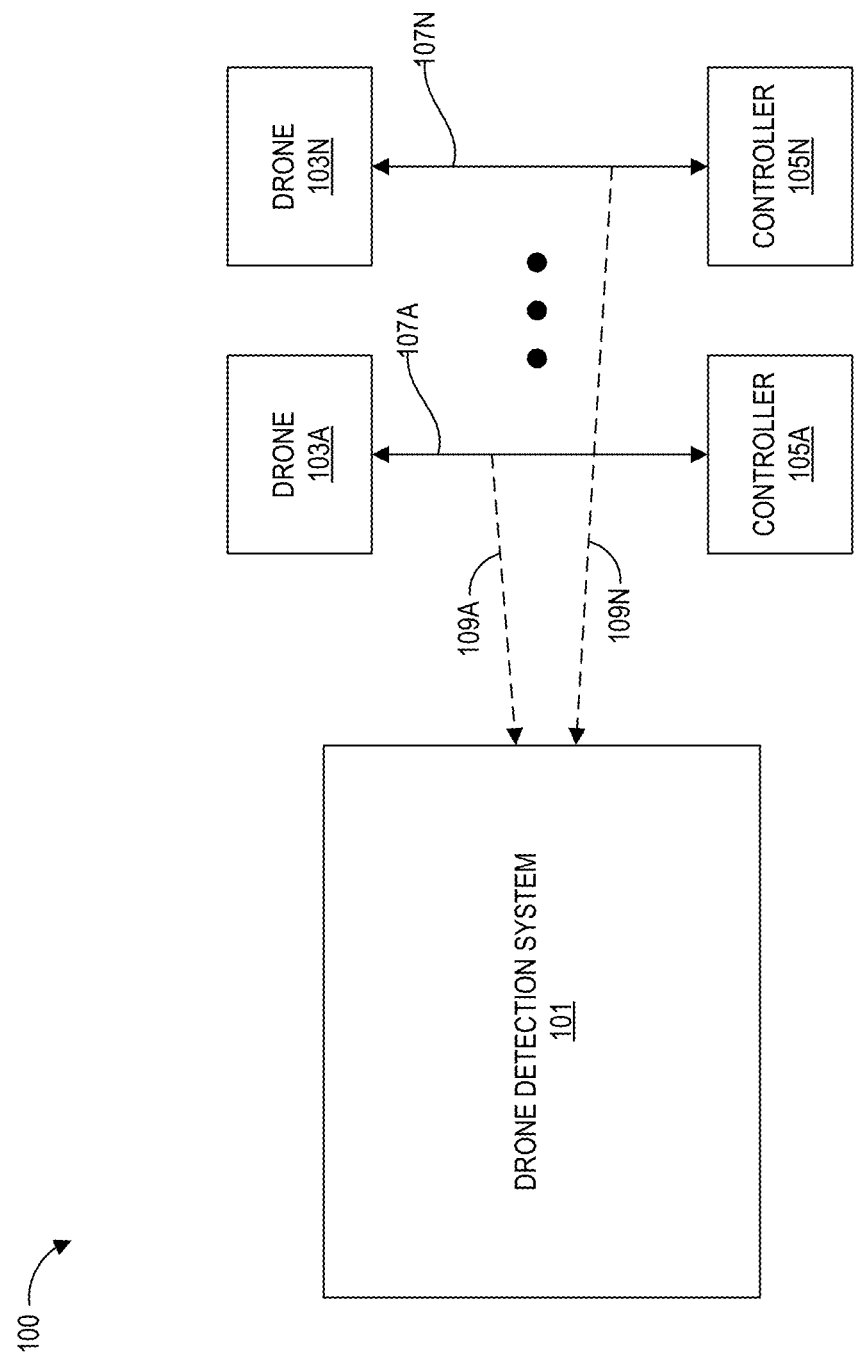
FIG. 1 illustrates an example environment including a drone detection system in accordance with aspects of this disclosure.

FIG. 1 illustrates an example environment 100 including a drone detection system 101 in accordance with aspects of this disclosure. In certain embodiments, the environment 100 includes the drone detection system 101, one or more drones 103A-103N, and one or more drone controllers 105A-105N (or simply "controllers"). An example of the one or more drones 103A-103N is illustrated in FIG. 2B. An example of the one or more controllers 105A-105N is illustrated in FIG. 2C.

In certain embodiments, each of the drones 103A-103N is configured to communicate to a corresponding one of the controllers 105A-105N via an RF signal 107A-107N. Although not illustrated, in some embodiments, a single one of the controllers 105A-105N may be configured to control more than one of the drones 103A-103N.

The drone detection system 101 is configured to receive eavesdrop 109A-109N on the communications between the drones 103A-103N and the controllers 105A-105N in order to detect the presence of the drones 103A-103N. For example, the drone detection system 101 may be configured to receive the RF signals 107A-107N being sent between the drones 103A-103N and the controllers 105A-105N in order to eavesdrop 109A-109N on the communication between the drones 103A-103N and the controllers 105A-105N. In certain embodiments, once the drone detection system 101 is able to decode the RF signals 107A-107N, the drone detection system 101 may monitor the drones 103A-103N and take certain actions in order to mitigate the potential threat of the drones 103A-103N. For example, as is explained with respect to FIG. 5, the drone detection system 101 may transmit a jamming RF signal to disrupt communication between the detected drone 103A-103N and the controller 105A-105N, and/or spoof the controller 105A-105N by sending a command to the drone 103A-103N to land or otherwise leave the environment 100.

Figure 2A:
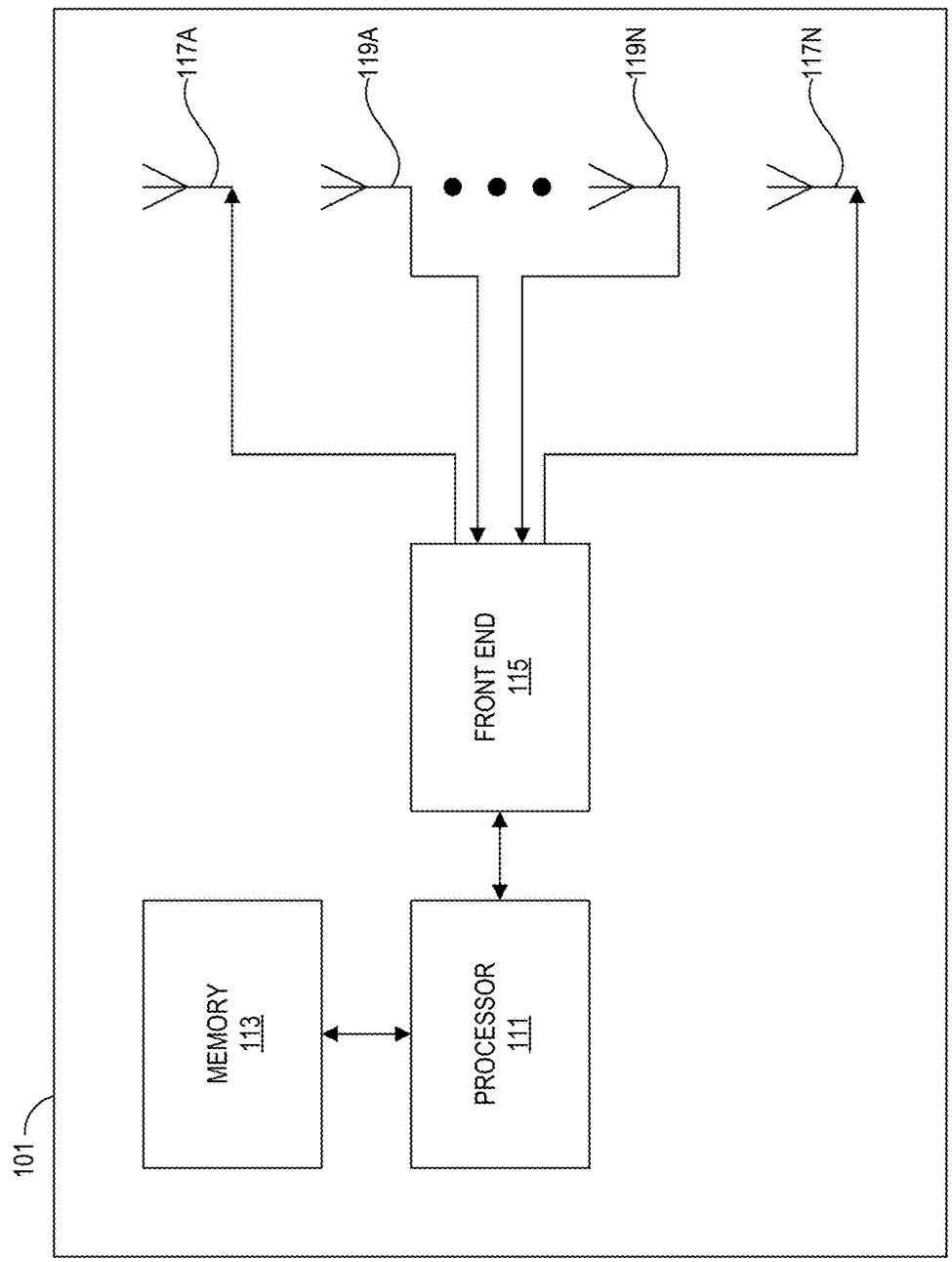
FIG. 2A illustrates an example drone detection system from FIG. 1 which can be used to detect, monitor, and/or mitigate drones in accordance with aspects of this disclosure.
Figure 2B:
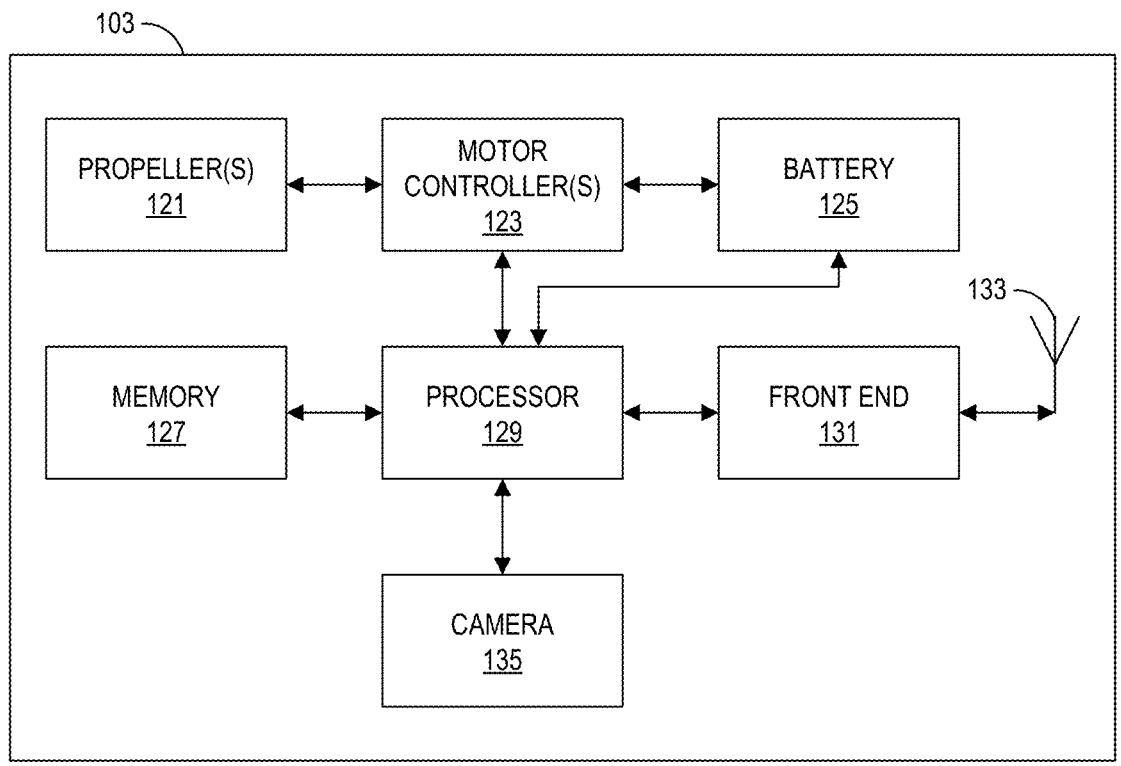
FIG. 2B illustrates an example drone from FIG. 1 which can be detected with the drone detection system of FIG. 2A in accordance with aspects of this disclosure.
Figure 2C:
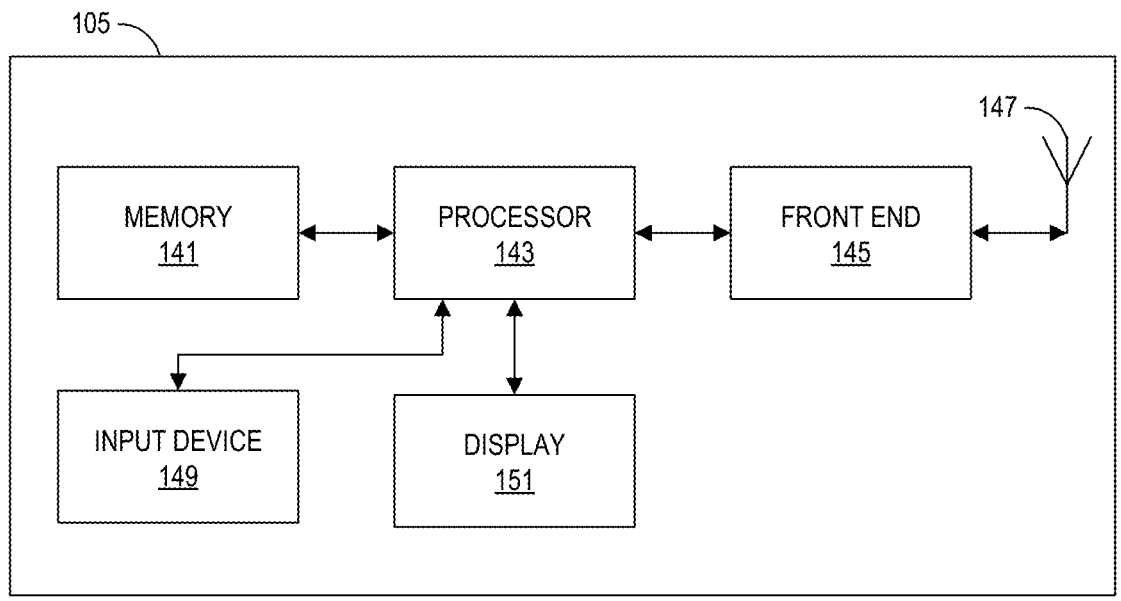
FIG. 2C illustrates an example controller from FIG. 1 which can be used to control the drone in accordance with aspects of this disclosure.

FIG. 2A illustrates an example drone detection system 101 which can be used to detect the presence of the one or more drones 103A-103N in accordance with aspects of this disclosure. In certain embodiments, the drone detection system 101 includes a processor 111, a memory 113, a front end 115, a plurality of transmit antennae 117A-117N, and a plurality of receive antennae 119A-119N. In other embodiments, one or more of the antennae 117A-119N can be used for both transmitting and receiving signals.

In certain embodiments, the drone detection system 101 is configured to receive an RF signal (e.g., the RF signals 107A-107N of FIG. 1) via one of the receive antennae 119A-119N. The one of the receive antennae 119A-119N provides the received RF signal to the front end 115. In certain embodiments, the front end 115 can process the received RF signal into a format that can be read by the processor 111. For example, in certain embodiments, the front end 115 may perform one or more of the following actions: filtering, amplifying, analog-to-digital conversion, etc. on the received RF signal.

In certain embodiments, the memory 113 can store computer readable instructions for causing the processor 111 to detect the presence of a drone (e.g., the drones 103A-103N of FIG. 1) based on the RF signals received via the receive antennae 119A-119N. In addition, in certain embodiments, the drone detection system 101 can also be configured to provide a signal (e.g., a jamming signal or an RF communication signal) to the front end 115 to be transmitted to the detected drone(s). The front end 115 can then process the signal received from the processor 111 before providing the processed signal to one or more of the transmit antennae 117A-117N.

There are a number of different techniques that the drone detection system 101 can use to detect the presence of the drones 103A-103N. For example, the drone detection system 101 can scan the airwaves at frequencies known to be used by particular model(s) of the drones 103A-103N. If a known protocol is identified, the drone detection system 101 can then decode the signal as if it was the intended receiver/controller 105A-105N. Depending on the embodiment, these decoding steps can include: synchronization, channel estimation, deinterleaving, descrambling, demodulation, and error control decoding. In certain embodiments, the drone detection system 101 can be configured to perform some of the aforementioned steps blindly due to lack of knowledge (such as device id) on information known by the controller 105A-105N. As described below, the blind detection of the drones 103A-103N using certain communication protocols (e.g., a synchronization signal) are provided herein. Once detected, the drone detection system 101 can provide alert(s) regarding the presence of the one or more drones 103A-103N.

The drone detection system 101 can monitor the presence of the one or more drones 103A-103N. As part of monitoring, a position of the one or more drones 103A-103N relative to the environment 100 can be monitored in real-time to determine if the position of the one or more drones 103A-103N strays inside or outside acceptable airspace.

There are also a number of mitigation actions which can be taken by the drone detection system 101. For example, after detecting the one or more drones 103A-103N, the drone detection system 101 may take one or more of the actions described with reference to FIG. 5. For example, in certain embodiments, these actions can include do nothing/keep monitoring, drone-specific jamming, wideband jamming, and control takeover.

FIG. 2B illustrates an example drone 103 which can be detected with the drone detection system 101 in accordance with aspects of this disclosure. In certain embodiments, the drone 103 includes one or more propellers 121, one or more motor controllers 123, a battery or other power source 125, a memory 127, a processor 129, a front end 131, an antenna 133, and a camera 135. As described above, the antenna 133 may be configured to receive RF signals 107 from the controller 105 (see FIG. 2C) and provide RF signals 107 back to the controller 105 (e.g., images obtained from the camera 135). In certain embodiments, the RF signals 107 sent/received from the antenna 133 are provided to/from the processor 129 and processed by the front end 131. In certain embodiments, the propeller(s) 121 provide lift and control movement of the drone 103 as it maneuvers through airspace. The propeller(s) 121 may also include one or more motor(s) (not illustrate) configured to individually power each of the propeller(s) 121.

In certain embodiments, the motor controller(s) 123 are configured to receive instructions from the processor 129 (e.g., based on instructions stored in the memory 127 and the RF signal 107 received from the controller 105) to move the drone 103 to a specific point in the airspace and translate the received instructions into motor position commands which are provided to the propeller(s) 121. In certain embodiments, the battery 125 provides power to each of the components of the drone 103 and has sufficient power storage to enable the propellers 121 to maneuver the drone 103 for a predetermined length of time. The camera 135 can capture images in real-time and provide the captured images to the controller 105 via the antenna 133 which can aid a user in controlling movement of the drone 103.

FIG. 2C illustrates an example controller 105 which can be used to control the drone 103 in accordance with aspects of this disclosure. In certain embodiments, the controller 105 comprises a memory 141, a processor 143, a front end 145, an antenna 147, an input device 149, and a display 151. As described above, the antenna 147 may be configured to receive RF signals 107 (e.g., images obtained from the camera 135) from the drone 103 (see FIG. 2B) and provide RF signals 107 back to the drone 103 to control movement of the drone 103. In certain embodiments, the RF signals 107 sent/received from the antenna 147 are provided to/from the processor 143 and processed by the front end 145. In certain embodiments, the input device 149 is configured to receive input from a user which can be used by the processor 143 to generate commands for controlling movement of the drone 103. In certain embodiments, the display 151 is configured to display images received from the drone 103 to the user to provide feedback on the current position of the drone 103 and its environment. In some embodiments, the display can be implemented as a pair of goggles worn by the user to provide a first person view of images obtained by the camera 135.

FIG. 2D illustrates an example RF signal 107 that can be sent from the controller 105 to the drone 103 or vice versa. With reference to FIG. 2D and in certain embodiments, the RF signal 107 includes a ZC sequence which is regularly transmitted (e.g., inserted into the RF signal at regular intervals) as a portion of the RF signal 107. In certain embodiments, the RF signal 107 further includes a plurality of data packets 202-206 used to provide data between the controller 105 and the drone 103 (e.g., include commands to move the drone and images obtained by the camera 135). As previously described, the ZC sequence 201 used to synchronize transmission of the RF signal 107 between the drone 103 and the controller 105 is generated using a ZC root, which is unknown to the drone detection system 101.

FIG. 2E illustrates an example signal 109 that the drone detection system 101 receives as a result of eavesdropping on the RF signal transmitted between the controller 105 and the drone 103. With reference to FIG. 2E and in certain embodiments, the signal 109 includes a plurality of samples 211-215 of the RF signal 107. Because the drone detection system 101 does not know the ZC root used to generate the ZC sequence 201, the location of the ZC sequence within the set of samples 211-215 is not known to the drone detection system 101. Aspects of this disclosure relate to techniques which can be employed by the drone detection system 101 in order to detect the presence of the drone 103 using the signal 109 as well as estimate the value of the ZC root.

Detection of Drone Using Synchronization Signals

With reference to FIG. 1, many of the drones 103A-103N in the market today employ orthogonal frequency division multiplexing (OFDM) modulation for transmitting high-resolution videos and communicating with their controllers 105A-105N and goggles. With reference to FIG. 1, certain of the drones 103A-103N employing OFDM may communicate with the controller 105A-105N using a synchronization signal which is used to synchronize the RF signals transmitted between the drone 103A-103N and the controller 105A-105N.

One example of a synchronization signal that can be used for RF synchronization is a Zadoff-Chu (ZC) sequence. For example, ZC sequences used for synchronization may have certain desirable properties such as zero autocorrelation for non-zero offset and low cross-correlation between two ZC sequences with different roots. Since the drones 103A-103N typically use different ZC sequences to avoid interference when they occupy the same airspace, ZC sequences can be used as unique features for detecting the presence of the drones 103A-103N. However, the ZC sequences used in these systems are known exclusively to the drone systems. In particular, ZC sequences may be generated using a unique ZC "root" value. There may be hundreds to thousands of possible ZC root values, and thus, it can be challenging to blindly detect (e.g., detect without knowledge of the ZC root value being used) the ZC sequences used by the drones 103A-103N in real time.

Aspects of this disclosure relate to the detection of the drones 103A-103N that use a synchronization signal to synchronize RF communication with the controller 105A-105N. The following description will provide embodiments in which a ZC sequence is used as a synchronization signal, however, those skilled in the art will recognize that the systems and techniques described herein may also be used to detect the presence of the drones 103A-103N that use other types of synchronization signals as well.

In order to detect the drone(s) 103A-103N that employ ZC sequences for synchronization, the presence of the drone(s) 103A-103N can be detected by detecting the presence of these ZC sequences in RF signals received at the drone detection system 101. ZC sequences are commonly using in communication protocols such as LTE systems. Certain techniques for detecting ZC sequences typically employ a bank of correlators for searching a very limited number of unknown ZCs. This is because the set of ZC sequences an LTE receiver needs to blindly search over is very limited, which is intended by the design of the LTE standard. For example, there are typically at most 3 ZC sequences for Primary Synchronization Signal (PSS) search and 64 ZC sequences for Physical Random Access Channel (PRACH) in a given cell. These traditional techniques cannot be applied to blind ZC detection for detection of the drones 103A-103N and monitoring systems without incurring a huge cost since running the detection in parallel for the large number of possible roots used for ZC sequences in communication with the drones 103A-103N would require too many parallel searches.

The number of drones 103A-103N which can be operated within a given area is limited to a maximum of three, and thus, a greater number of ZC roots are used to ensure that each unique drone 103A-103N and controller 105A-105N pair uses a different ZC root in generating the ZC sequence. In order to avoid the use of the same ZC root, the number of possible roots used for generating ZC sequences for synchronizing RF drone communication may be in the hundreds, thousands, or even higher. Thus, in order to attempt detection of the ZC sequence using each of the possible ZC roots would involve running potentially thousands of parallel searches, which is impractical due to the costs involved in building such a system. Accordingly, it is a great challenge to blindly detect thousands of unknown ZC sequences possibly used by the drones in real time.

Aspects of this disclosure relate to systems and methods for low-complexity and cost effective blind ZC detection. At least some of the techniques used to detect ZC sequences described herein are based on a double differential for low-cost drone detection and monitoring systems. In detail, aspects of this disclosure relate to a low-complexity blind ZC detection system and method based on double differentials capable of detecting a large number of unknown ZC sequences used in OFDM-based drone systems in real time. Certain embodiments of this disclosure can be applied to blind ZC detection for ZC sequences deployed in time domain, in frequency domain without guard band, and in frequency domain with guard band.

Model of OFDM-Based Synchronization Signal Communication

In order to describe the systems and techniques used for detection of a ZC sequence, first a model of a ZC sequence used for synchronization of communications between the drone 103A-103N and the controller 105A-105N will be provided. Consider an OFDM-based drone system with N subcarriers and cyclic prefix (CP) of L samples. L is larger than the largest multipath delay spread for eliminating inter-symbol interference. To facilitate synchronization, a time domain or frequency domain ZC sequence is transmitted by the drone 103A-103N and the controller 105A-105N regularly. A ZC sequence of length P with root u is defined as:

$$x_u[n] = \exp\left(-\frac{j\pi un(n+1)}{P}\right), 0 \leq n < P, \quad (1)$$

where P, P≤N, is an odd prime number and 1≤u<P is the root of the sequence. For a time domain ZC sequence, the time domain OFDM samples s[n], n=0, 1, ..., L+N−1, including CP is given by:

$$s[n] = \begin{cases} x_u[n-L], & L \leq n < L+P \\ 0, & L+P \leq n < L+N \\ s[n+N], & 0 \leq n < L \end{cases} \quad (2)$$

For a frequency domain ZC sequence, the frequency domain OFDM samples S[k], k=−[N/2], ..., N−[N/2], with the ZC sequence mapped to the center of channel bandwidth is given by:

$$S[k] = \begin{cases} x_u\left[k + \frac{P-1}{2}\right], & -\frac{P-1}{2} \leq k \leq \frac{P-1}{2} \\ 0, & \text{otherwise.} \end{cases} \quad (3)$$

Note that this formulation includes the special case of P=N. The time domain samples are simply the IDFT of S[k]. Let $f_s$ and $\Delta_f$ be the sampling frequency and the frequency offset, respectively. The received sequence y[n] is:

$$y[n]=hs[n]\exp(j\Delta_\theta n)+w[n] \quad (4)$$

where $\Delta_\theta \triangleq 2\pi\Delta_f/f_s$, h is channel gain, and w is additive white Gaussian noise (AWGN) with power constraint $E\{|w|^2\}=\sigma^2$. For the purposes of modeling the ZC sequence, it is assumed that the channel experiences frequency flat block fading where a single fading coefficient applies to the entire bandwidth and is held constant for the OFDM symbol. It is also assumed that ZC sequence length P is known, which can be obtained by reverse engineering.

Overview of Techniques for Detecting Synchronization Sequence

Figure 3:
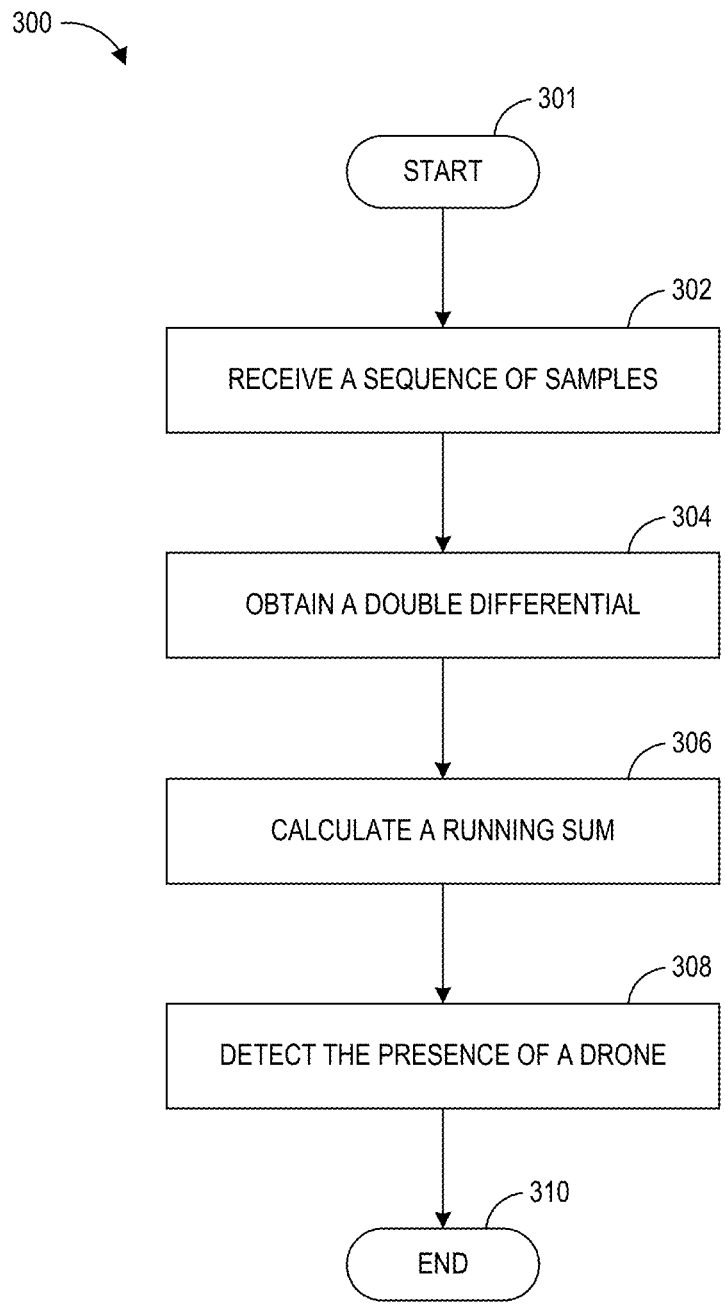
FIG. 3 illustrates a method for detecting the presence of the drone in accordance with aspects of this disclosure.

FIG. 3 illustrates a method 300 for detecting the presence of the drone 103A-103N in accordance with aspects of this disclosure. Specifically, the method 300 involve detecting a synchronization sequence used in synchronizing communications between the drone 103A-103N and the controller 105A-105N in order to detect the presence of the drone 103A-103N.

The method 300 begins at block 301. At block 302, the method 300 involves receiving a sequence of samples of an RF signal 107A-107N transmitted between the drone 103A-103N and the controller 105A-105N. The RF signal 107A-107N includes the synchronization signal for synchronization of the RF signal between the drone 103A-103N and the controller 105A-105N. In some implementations, the synchronization signal is a ZC sequence.

At block 304, the method 300 involves obtaining a double differential of the received sequence of samples. At block 306, the method 300 involves calculating a running sum of a defined number of the double differential of the received sequence of samples. Finally, at block 308, the method 300 involves detecting the presence of the drone based on the running sum. The method 300 ends at block 310.

The specific actions involved in each of steps 302-308 may vary depending on the particular implementation of the communication protocol between the drone 103A-103N and the controller 105A-105N. For example, these steps may vary depending on whether the ZC sequence is transmitted in the time or frequency domain. In addition, these steps may further vary based on whether a guard band is used when the ZC sequence is transmitted in the frequency domain. Additional details regarding how these blocks 302-308 can be implemented are provided herein.

Time Domain Sequence with Unknown Root

In some implementations, the drone 103A-103N can communicate with the controller 105A-105N by providing the ZC sequence in the time domain. This section will provide a description of the techniques used to detect the ZC sequence having an unknown root (e.g., blind detection) in the time domain.

Since P is an odd prime number, there are P−1 possible roots and corresponding ZC sequences. Typical values of P in drone systems can range from hundreds to thousands. However, aspects of this disclosure can be used for detecting ZC sequences in which the value of P is less or greater than the range of hundreds to thousands. For values of P which are within the above range, the complexity of a large correlator bank required to perform an exhaustive search (e.g., a search over all possible root values) is generally too high to be performed in real time. To address this challenge, the drone detection system 101 can be configured to perform a low complexity double differential method to blindly estimate the ZC root.

The single and double differentials of sequence s[n] are defined as:

$$s^d[n] \triangleq s[n]s^H[n-1] \qquad (5)$$

$$s^{dd}[n] \triangleq s^d[n](s^d[n-1])^H \qquad (6)$$

respectively, where superscripts d and dd are single and double differential operators, respectively, and H denotes Hermitian operation. Using (5) and (6), the single and double differentials of the ZC sequence $x_u[n]$ can be derived as:

$$x_u^d[n] = \exp\left(-\frac{2j\pi un}{P}\right), x_u^{dd}[n] = \exp\left(-\frac{2j\pi u}{P}\right) \qquad (7)$$

respectively. Taking single and double differentials on both sides of (4) results in the following:

$$y^d[n] = |h|^2 \exp(j\Delta_\theta)x_u^d[n] + \overline{w}^d[n] \qquad (8)$$

$$y^{dd}[n] = |h|^4 x_u^{dd}[n] + \overline{w}^{dd}[n] \qquad (9)$$

where the effective noise terms $\overline{w}^d[n]$ and $\overline{w}^{dd}[n]$ are:

$$\overline{w}_d[n] \triangleq w^d[n] + hd[n]\exp(j\Delta_\theta n)w^H[n-1] + h^H s^H[n-1]\exp(-j\Delta_\theta)x_u^d[n](\overline{w}^d[n-1] \qquad (10)$$

$$\overline{w}^{dd}[n] \triangleq \overline{w}^d[n] + |h|^2 \exp(j\Delta_\theta)x_u^d[n](\overline{w}^d[n-1])^H + |h|^2\exp(-j\Delta_\theta)(x_u^d[n-1])^H \overline{w}^d[n] \qquad (11)$$

One consequence of these equations is that the carrier frequency offset (CFO) term $\exp(j\Delta_\theta)$ in (8) disappears from (9) and does not affect the distribution of the noise term in (11).

For detecting the ZC sequence in received signals (e.g., in the sequence of samples received in block 302), the drone detection system 101 can calculate a normalized running sum at block 306 of the method 300 of the last P−2 time domain differential samples of $\gamma^{dd}$ (calculated at block 304) as:

$$\gamma_{td}[n] \triangleq \frac{\sum_{n=2}^{P-1} y^{dd}[n]}{\sqrt{\sum_{n=2}^{P-1} |y^{dd}[n]|^2}}. \qquad (12)$$

The drone detection system 101 can detect the presence of the drone 103A-103N in response to $|\gamma_{td}[n]|$ exceeding a predefined threshold value. The OFDM symbol boundary estimate is $n^* \triangleq \arg\max_n |\gamma_{td}[n]|$. The ZC root estimate $\hat{u}$ is:

$$\hat{u} = \text{round}\left(\frac{PL(\gamma_{td}^H[n^*])}{2\pi}\right), \qquad (13)$$

where $\angle(\gamma)$ returns the angle of $\gamma$ in $[0; 2\pi)$. Here, the Hermitian operation on the metric functions to keep the angle positive. If synchronization is imperfect and n* lands within the CP region, the analysis is identical for the special case of N=P due to the periodic property of ZC sequences. If N≠P, (13) is still effective with small performance degradation.

It is nontrivial to mathematically analyze the estimation error probability of (13). However, the following sets forth a technique for determining the lower bounds of the effective SNR in high and low SNR regimes, which is generally indicative of estimation performance. Specifically, the power bounds of (10) and (11) and then effective SNR are determined as follows:

$$|\overline{w}^d[n]| \le |w^d[n]| + |h|(|e^{j\alpha_n}w^H[n-1]| + w[n]|) \qquad (14)$$

$$E|\overline{w}^d[n]|^2 \le \sigma^4 + 4|h|^2\sigma^2 + O(|h|\sigma^3), \qquad (15)$$

$$E|\overline{w}^{dd}[n]|^2 \le 2\sigma^8 + 5|h|^4\sigma^4 + O(|h|\sigma^7 + |h|^3\sigma^5) \qquad (16)$$

$$|\overline{w}^{dd}[n]| \le |\overline{w}^{dd}[n]| + |h|^2(|\overline{w}^d[n-1]| + |\overline{w}^d[n]|) \qquad (17)$$

$$E|\overline{w}^{dd}[n]|^2 \le 2\sigma^8 + (8+2\sqrt{10})|h|^6\sigma^2 + O(|h|\sigma^7 + |h|^3\sigma^5) \qquad (18)$$

$$\||h|^4 x_u^{dd}[n]\|^2 = |h|^8 \qquad (19)$$

$$SNR_{td} = \frac{(P-2)|h|^8}{E|\overline{w}^{dd}[n]|^2}, \qquad (20)$$

where $\alpha_n = \Delta_\theta(2n-1) + L(h^2 s[n]s[n-1])$ and $O(.)$ is the big-O notation. (14) uses triangle inequality. (15) uses $e^{j\alpha}w[n-1] \stackrel{d}{=} +w[n]$ w[n-1]+w[n] for identically and independently complex white Gaussian distributed w[n-1] and w[n], where $\alpha$ is any real constant and $\stackrel{d}{=}$ refers to identical in distribution. (16) uses Cauchy-Schwarz inequality and $E|w[n]|^4 = 2\sigma^2$, a result from Chi-Squared distribution, to compute coefficients of both $\sigma^8$ and $|h|^4\sigma^4$. (17) uses triangle inequality. (18) uses (15), (16), and Lp norm inequality for complex number: $E|\overline{w}^{dd}[n]| \le \sqrt{2E|\overline{w}^{dd}[n]|^2}$. Also (19) can be derived from (7). (20) can be obtained using (18) and (19). Finally, the lower bounds of effective SNR in high and low SNR regimes can be obtained as:

$$\lim_{\frac{|h|^2}{\sigma^2} \to \infty} \frac{SNR_{td}}{|h|^2/\sigma^2} \ge \frac{P-2}{8+2\sqrt{10}} \qquad (21)$$

$$\lim_{\frac{|h|^2}{\sigma^2} \to 0^+} SNR_{td} \ge \frac{(P-2)|h|^8}{2\sigma^8}. \qquad (22)$$

Note that at high SNR, (21) grows linearly with native SNR. At low SNR, (22) degrades at the fourth power of native SNR, as expected from using double differential.

Frequency Domain Synchronization Sequence without Guard Band

In some implementations, the drone 103A-103N can communicate with the controller 105A-105N by providing the ZC sequence in the frequency domain without the use of guard bands. This section will provide a description of the techniques used to detect the ZC sequence having an unknown root (e.g., blind detection) in the frequency domain without guard bands in certain embodiments.

In this implementation, the OFDM symbol contains N=P subcarriers and the subcarriers are allocated as in (3) above. This implementation is a variation of the implementation described above in the section titled "Time Domain Sequence with Unknown Root."

The Fourier Dual property of a ZC sequence in both DFT and IDFT forms are described in Property 1. Property 1: The P-point DFT and IDFT of (1) are:

$$\mathcal{F}\{x_u\}[k] = x_u^H[u^{-1}k]\mathcal{F}[0] \qquad (23)$$

$$\mathcal{F}^{-1}\{x_u\}[n] = x_u^H[u^{-1}n-1]\mathcal{F}^{-1}\{x_u\}[0] \qquad (24)$$

where inverse root $u^{-1}$ satisfies $uu^{-1}=1$ mod P.

After some manipulations, the single and double differentials of (24) can be obtained as:

$$\mathcal{F}^{-1}\{x_u\}^d[n] = \qquad (25)$$
$$|\mathcal{F}^{-1}\{x_u\}[0]|^2 \exp\left(\frac{j2\pi u^{-1}n}{P}\right) \times \exp\left(-\frac{j\pi uu^{-1}(u^{-1}-1)}{P}\right),$$

$$\mathcal{F}^{-1}\{x_u\}^{dd}[n]|\mathcal{F}^{-1}\{x_u\}[0]|^4 \exp\left(\frac{j2\pi u^{-1}}{P}\right), \qquad (26)$$

where (25) used $uu^{-1}=1$ mod P.

For synchronization and blind ZC root detection, the drone detection system 101 can calculate the normalized running sum of $y^{dd}[n]$ at block 304 as follows:

$$\gamma_{fd1}[n] \triangleq \frac{\sum_{n=2}^{P-1} y^{dd}[n]}{\sqrt{\sum_{n=2}^{P-1} |y^{dd}[n]|^2}}. \qquad (27)$$

The drone detection system 101 can detect the presence of the drone 103A-103N in response to $|\gamma_{fd1}[n]|$ exceeding a predefined threshold. The symbol boundary estimate is $n^* \triangleq \arg\max_n |\gamma_{fd1}[n]|$. The drone detection system 101 can estimate the ZC root as:

$$\hat{u}^{-1} = \text{round}\left(\frac{PL\gamma_{fd1}[n^*]}{2\pi}\right). \qquad (28)$$

$\hat{u}$ can be determined by solving $\hat{u}\hat{u}^{-1}=1$ mod P. The SNR bounds are identical to (21) and (22) in the section titled "Time Domain Sequence with Unknown Root" because the signal and noise power terms are the same.

Frequency Domain Synchronization Sequence with Guard Band

To satisfy spectral mask, modern OFDM systems usually do not allocate data on edge subcarriers. Accordingly, in some implementations, the drone 103A-103N can communicate with the controller 105A-105N by providing the ZC sequence in the frequency domain with the use of guard bands. This section will provide a description of the techniques used to detect the ZC sequence having an unknown root (e.g., blind detection) in the frequency domain with guard bands.

In this implementation, the OFDM symbol contains N>P subcarriers. The ZC sequences are modulated on the subcarriers as in (3) with guard bands. Unfortunately, in this case Property 1 no longer holds. Without the property, it is very challenging to derive a closed-form expression for detecting a ZC sequence with unknown root in time domain.

With the assumption that coarse timing acquisition has occurred, the drone detection system 101 may be able to blindly identify the unknown ZC sequence root. This can be achieved when there is another synchronization mechanism in other parts of the RF signal transmission between the drone 103A-103N and the controller 105A-105N. The method of detecting the drone 103A-103N may function based on the assumption that the estimated OFDM symbol to start within the CP region and thus the time domain samples $\{y[n]\}_{n=0}^{N-1}$ represent a cyclic shifted and noisy version of the intended transmission.

Let $\Delta$ be the unknown timing offset, which results in phase ramping in frequency domain. The drone detection system 101 may take the N-point DFT of $\{y[n]\}_{n=0}^{N-1}$. Using (1), for $$k = -\frac{P-1}{2}, \ldots, \frac{P-1}{2},$$

$$Y[k] = x_u\left[k - \frac{P-1}{2}\right]\exp\left(-\frac{j2\pi\Delta k}{N}\right) + W[k], \qquad (29)$$

where $W[k]$ is the AWGN noise with power $E|W[k]|^2 = \sigma^2$. Following the derivation in the section titled "Time Domain Sequence with Unknown Root" and using (7), the drone detection system 101 can obtain $Y_{fd2}[k]$, $Y^{dd}[k]$ metric $\gamma_{fd2}[k]$, and root estimate $\hat{u}$ as:

$$Y^d[k] = \exp\left(-\frac{2j\pi uk}{P}\right)\exp\left(-\frac{2j\pi\Delta}{N}\right) + \overline{W}^d[k]. \qquad (30)$$

$$Y^{dd}[k] = \exp\left(-\frac{2j\pi u}{P}\right), \qquad (31)$$

$$\gamma_{fd2}[k] \triangleq \sum_{k=2}^{P-1} Y^{dd}[k], \qquad (32)$$

$$\hat{u} = \text{round}\left(\frac{PL\left(\gamma_{fd2}^H\left[\frac{P-1}{2}\right]\right)}{2\pi}\right). \qquad (33)$$

The metric $\gamma_{fd2}[k]$ in certain embodiments does not need to be normalized when detecting a ZC sequence with a guard band as it is only necessary to determine the angle of the resulting metric. Thus, the drone detection system 101 can detect the presence of the drone 103A-103N in response to the metric $\gamma_{fd2}[k]$ exceeding a predefined threshold. The SNR characteristics may be the same as those in the section titled "Time Domain Sequence with Unknown Root" since the same operations are performed in this embodiment except in the frequency domain. However, unlike time domain differential approaches, certain frequency domain approaches may not robust to CFO.

Example Method for Monitoring the Drone(s)

Figure 4:
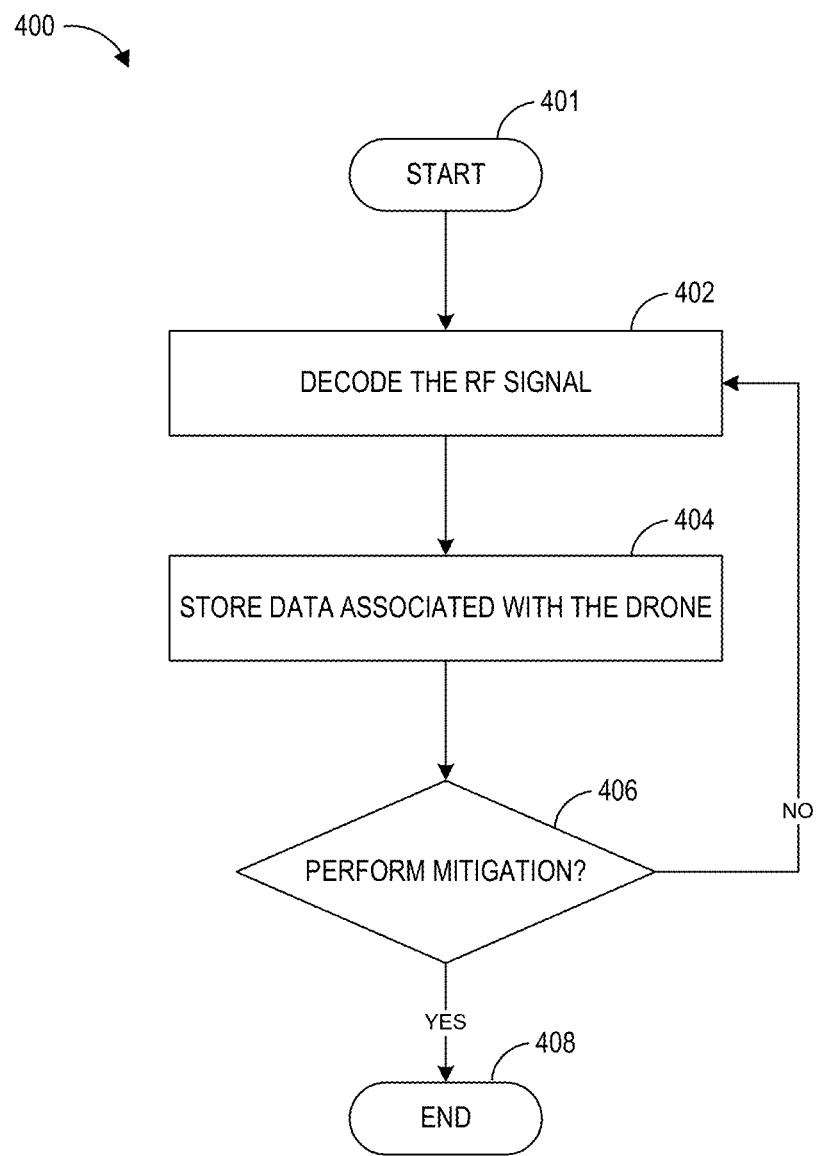
FIG. 4 illustrates a method for detecting the presence of the drone in accordance with aspects of this disclosure.

Once a drone 103 has been detected, for example, using one of the above metrics, the drone detection system 101 can monitor the drone 103 for a period of time before potentially taking mitigation actions against the drone 103. FIG. 4 is an example method 400 which can be performed by the drone detection system 101 to monitor one or more of the drones 103.

The method 400 begins at block 401. In certain implementations, the method 400 may be performed in response to detecting the drone 103 based on the method 300 of FIG. 3. At block 402, the method 400 involves decoding the RF signal 107 transmitted between the drone 103 and the controller 105. In the case where the RF signal 107 includes a ZC sequence, the decoding of the RF signal 107 may be performed using the ZC root determined in accordance with aspects of this disclosure.

At block 404, the method 400 involves storing data associated with the drone 103 from the decoded RF signal 107. For example, the data can include any activities performed by the drone 103 (e.g., flight data), drone behaviors that may indicate whether the drone 103 is a friend or foe, a unique drone identifier, etc. At block 406, the method 400 involves determining whether to perform mitigation actions on the drone 103. In response to determining that mitigation actions are warranted, the method 400 may end at block 406, where a mitigation method 500 can be performed. In response to determining that mitigation actions are not warranted, the method 400 returns to block 402.

Example Method for Mitigating the Drone(s)

Figure 5:
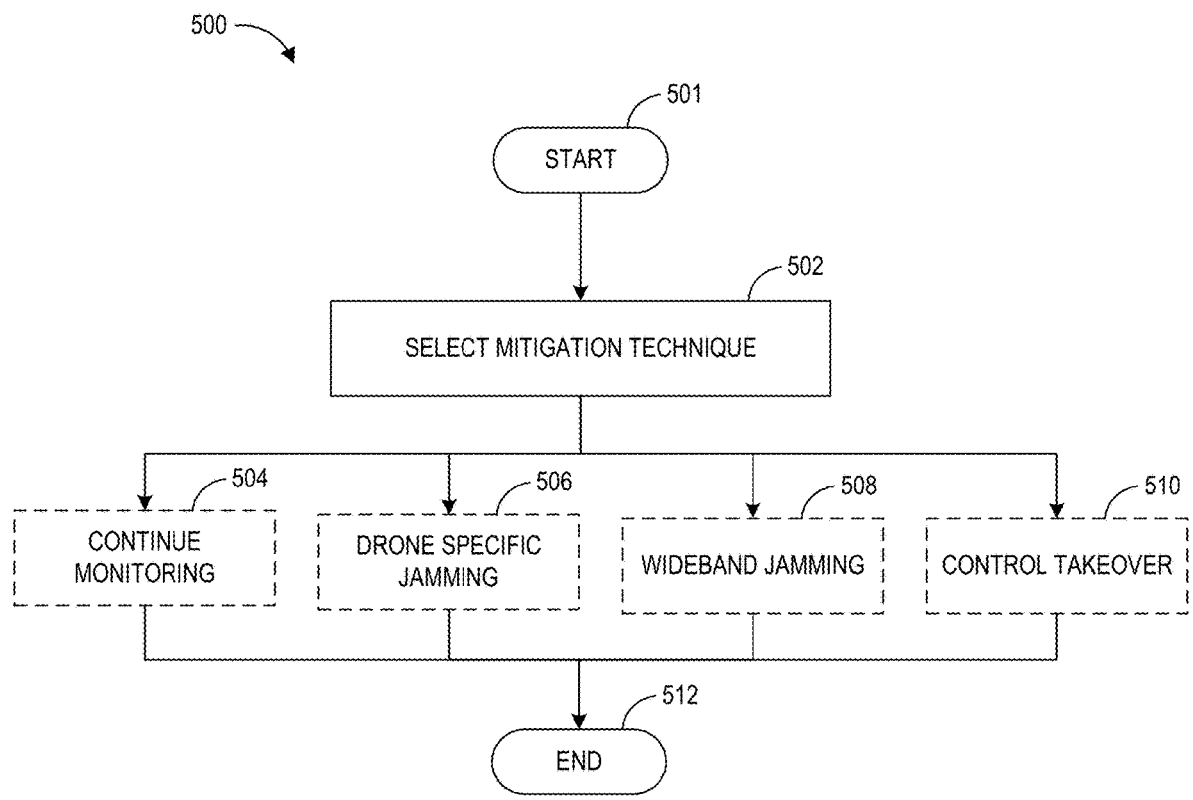
FIG. 5 illustrates a method for detecting the presence of the drone in accordance with aspects of this disclosure.

After determining that mitigation of the drone 103 is appropriate and in certain embodiments, the drone detection system 101 performs one or more of a number of different mitigation actions in accordance with aspects of this disclosure. FIG. 5 is an example method 500 which can be performed by the drone detection system 101 to mitigate one or more of the drones 103.

The method 500 begins at block 501. In certain implementations, the method 500 may be performed in response to determining that mitigation actions are warranted in block 406 of FIG. 4. At block 502, the method 500 involves selecting a mitigation technique to perform. The method 500 then involves continuing to one of blocks 504-510 based on the mitigation technique selected in block 502.

At block 504, the method 500 involves continuing to monitor the drone 103, which may involve returning to block 402 of method 400. For example, if the drone 103 is determined to be friendly and/or if the drone detection system 101 does not have the legal authority to take more aggressive actions, the drone detection system 101 may only be authorized to continue monitoring the drone 103 while alerting a user to the presence of the drone 103.

At block 506, the method 500 involves performing drone specific jamming. For example, in the case that the drone detection system 101 has decoded the ZC root used by the drone 103 and the controller 105, the drone detection system 101 may be able to jam the RF signal 107 to affect movement of the drone 103 using the ZC root without affecting the operation of other drones 103 in the environment 100.

At block 508, the method 500 involves the drone detection system 101 performing wideband jamming. In certain embodiments, wideband jamming may be appropriate where the drone detection system 101 does not have sufficient knowledge of the communication protocol used by the RF signal 107 to perform drone specific jamming and where the wideband jamming will not affect other friendly drones 103 within the environment 100.

At block 510, the method involves the drone detection system 101 taking over control of the drone 103. For example, and in certain embodiments, using the ZC root detected in accordance with aspects of this disclosure, the drone detection system 101 can send commands to the drone 103 in order to have the drone 103 perform certain maneuvers, such as landing the drone 103 in a safe area. The method 500 ends at block 512.

Simulations

Figure 6:
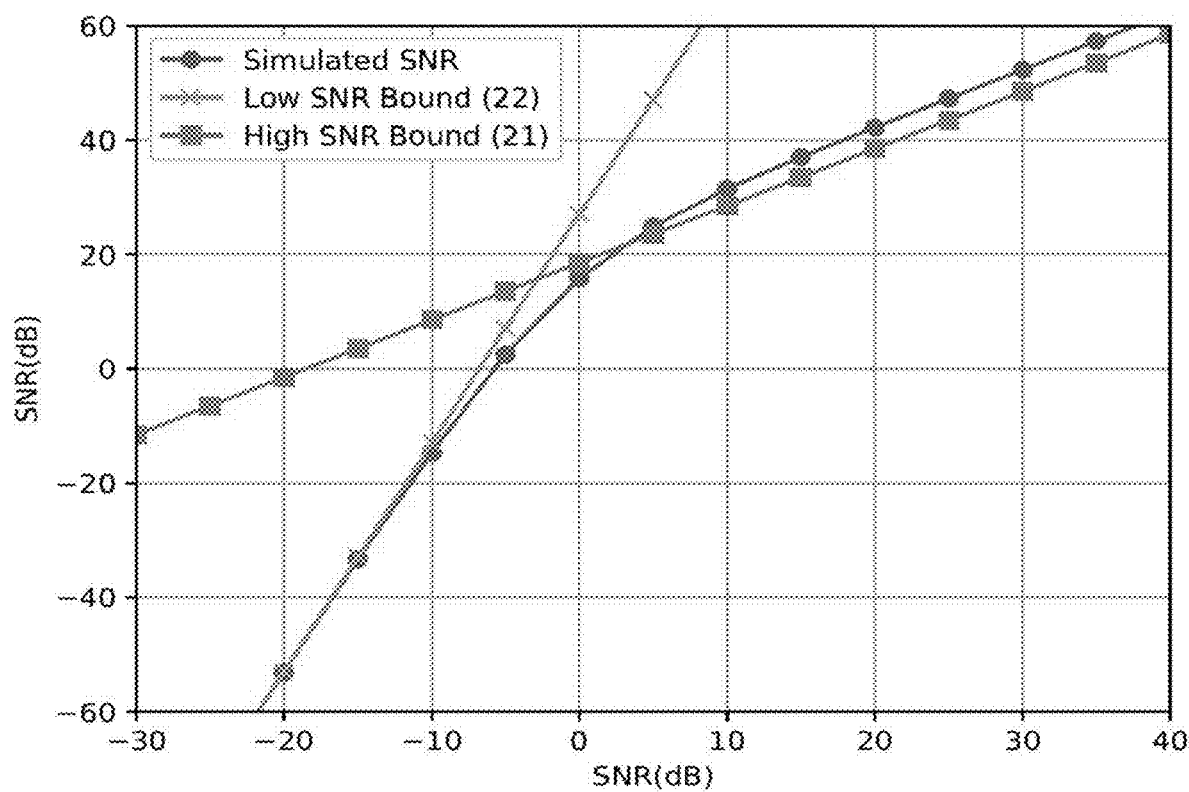
FIG. 6 is a graph which compares the simulated SNR to the lower bound in low SNR regime and the lower bound in high SNR regime.

The following description provides a verification of the above techniques for detecting the drone 103A-103N. Monte Carlos simulations of 30,000 iterations were used to verify the results. First, a verification of the derived SNR lower bounds for high and low SNR regimes will be shown. FIG. 6 is a graph which compares the simulated SNR (20) to the lower bound in low SNR regime (22) and the lower bound in high SNR regime (21). In low SNR regime, (22) matches simulated SNR closely. In high SNR regime, (21) has a constant gap from simulated SNR. As discussed, the gap is due to looseness of some approximations. Next, a ZC sequence deployed in time domain with P=1021, N=1024, and L=80 with an arbitrary ZC root of 100 will be considered. Since P is prime, there are P−1=1020 possible ZC roots. A simulation of the case without CFO and the case with 5 percent of subcarrier spacing as CFO are discussed below.

Figure 7A:
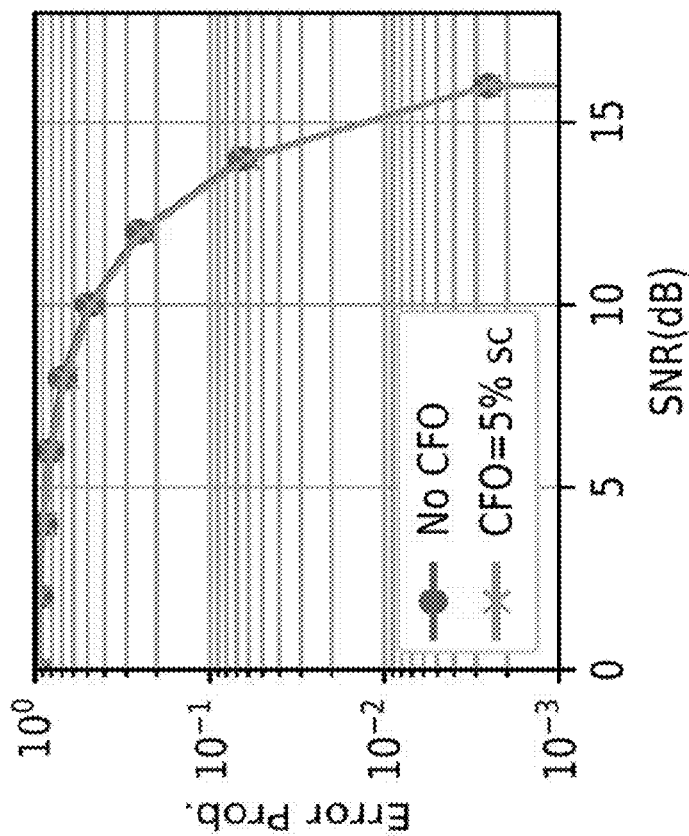
FIG. 7A is a graph showing the detection error rate for a time domain ZC sequence.

FIG. 7A is a graph showing the detection error rate for a time domain ZC sequence. A detection error event occurs if the estimated root is not the same as the true root of 100. As seen from FIG. 7A, the ZC sequence root blind estimation accuracy achieves 1% error probability at 15 dB SNR. Hence, at moderate to high SNR regimes the methods described herein are effective in both synchronization and blindly estimating ZC sequence root for a time domain ZC sequence. Also note that, CFO does not have any impact on detection performance.

Figure 7B:
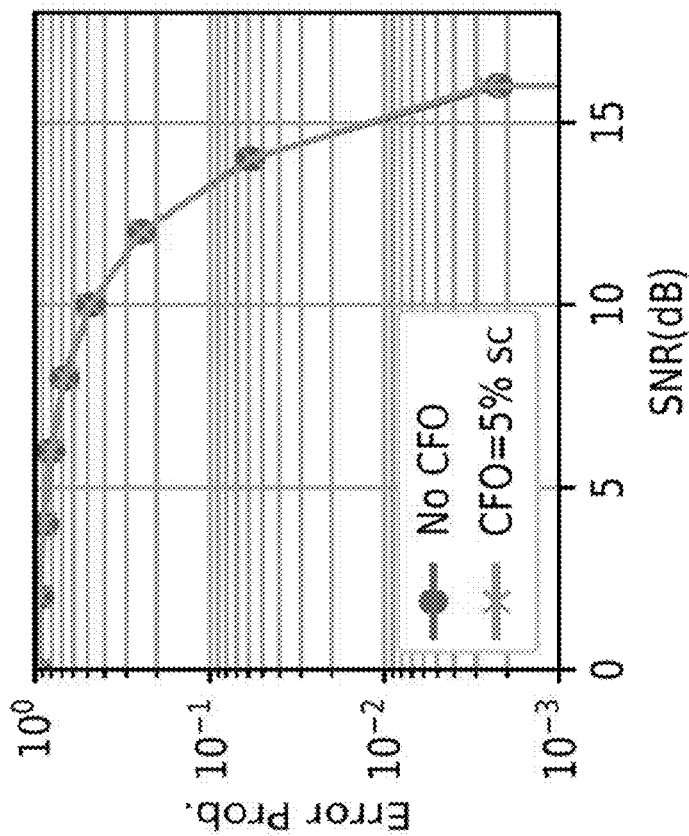
FIG. 7B is a graph depicting detection error rate for frequency domain ZC sequences without guard subcarriers. ZC sequence root blind estimation accuracy also achieves 1% error at 15 dB SNR.

FIG. 7B is a graph depicting detection error rate for frequency domain ZC sequences without guard subcarriers. ZC sequence root blind estimation accuracy also achieves 1% error at 15 dB SNR. This is similar to the time domain version, as analyzed in above in the section titled "Frequency Domain Synchronization Sequence Without Guard Band." In this case, CFO also has no impact on detection performance.

Figure 8:
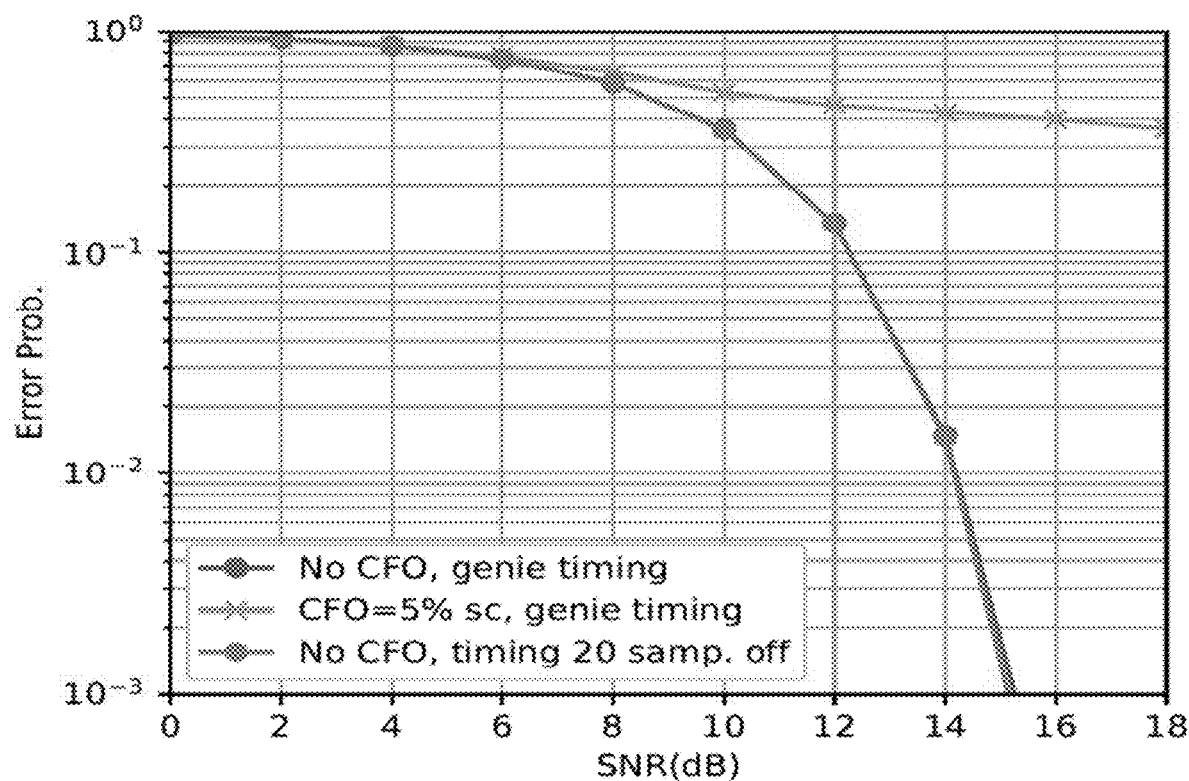
FIG. 8 is a graph showing the blind root detection performance in frequency domain with guard subcarriers.

Finally, FIG. 8 is a graph showing the blind root detection performance in frequency domain with guard subcarriers. Both perfect symbol timing and symbol timing off by 20 samples are plotted. Note that the timing offset has no effect on the detection performance. However, as expected, a CFO size of 5% of subcarrier spacing substantially degrades the detection performance.

Implementing Systems and Terminology

Implementations disclosed herein provide systems, methods and apparatus for detecting the presence of drones. It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The drone detection functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A system for detecting presence of a drone, the system comprising:
    a radio-frequency (RF) receiver configured to receive an RF signal transmitted between a drone and a controller, the RF signal including a synchronization signal for synchronization of the RF signal;
    at least one processor; and
    a computer-readable memory in communication with the at least one processor and having stored thereon computer-executable instructions to cause the at least one processor to:
    receive a sequence of samples from the RF receiver,
    obtain a double differential of the received sequence of samples,
    calculate a running sum of a defined number of the double differential of the received sequence of samples,
    detect the presence of the drone based on the running sum,
    synchronize with the RF signal based on the running sum,
    determine a metric based on the running sum, wherein the metric is determined according to the following equation:

$$\gamma_{fd2}[k] \triangleq \sum_{k=2}^{P-1} Y^{dd}[k],$$

wherein $Y_{fd2}[k]$ is the metric, $Y^{dd}[k]$ is the double differential, and P is a length of the synchronization signal, and
    determine that the metric is greater than a threshold value,
    wherein the detecting of the presence of the drone is further based on the determination that the metric is greater than the threshold value.

2. The system of claim 1, wherein the synchronization signal comprises a Zadoff-Chu (ZC) sequence.

3. The system of claim 1, wherein the synchronization signal comprises a frequency domain sequence including guard bands.

4. The system of claim 1, wherein the computer-readable memory further has stored thereon computer-executable instructions to cause the at least one processor to estimate a root of the sequence of samples based on the metric.

5. The system of claim 4, wherein the synchronizing with the RF signal is performed using the estimated root.

6. The system of claim 1, wherein:
    the synchronization signal comprises a time domain sequence, and
    the running sum is normalized.

7. The system of claim 6, wherein the computer-readable memory further has stored thereon computer-executable instructions to cause the at least one processor to:
    determine that an absolute value of the normalized running sum is greater than a threshold value,
    wherein the detecting of the presence of the drone is further based on the determination that the absolute value of the normalized running sum is greater than the threshold value.

8. The system of claim 7, wherein the computer-readable memory further has stored thereon computer-executable instructions to cause the at least one processor to estimate a root of the sequence of samples based on the normalized running sum.

9. A method for detecting presence of a drone, the method comprising:
    receiving a sequence of samples of an RF signal transmitted between a drone and a controller, the RF signal including a synchronization signal for synchronization of the RF signal;
    obtaining a double differential of the received sequence of samples;
    calculating a running sum of a defined number of the double differential of the received sequence of samples;
    detecting the presence of the drone based on the running sum;
    synchronizing with the RF signal based on the running sum;
    determining a metric based on the running sum, wherein the metric is determined according to the following equation:

$$\gamma_{fd2}[k] \triangleq \sum_{k=2}^{P-1} Y^{dd}[k],$$

wherein $Y_{fd2}[k]$ is the metric, $Y^{dd}[k]$ is the double differential, and P is a length of the synchronization signal; and
    determining that the metric is greater than a threshold value,
    wherein the detecting of the presence of the drone is further based on the determination that the metric is greater than the threshold value.

10. The method of claim 9, wherein the synchronization signal comprises a Zadoff-Chu (ZC) sequence.

11. The method of claim 9, wherein the synchronization signal comprises a frequency domain sequence including guard bands.

12. The method of claim 9, further comprising:
estimating a root of the sequence of samples based on the running sum.

13. The method of claim 9, wherein:
the synchronization signal comprises a time domain sequence, and
the running sum is normalized.

14. The method of claim 13, further comprising:
determining that an absolute value of the normalized running sum is greater than a threshold value,
wherein the detecting of the presence of the drone is further based on the determination that the absolute value of the normalized running sum is greater than the threshold value.

15. A non-transitory computer readable storage medium having stored thereon instructions that, when executed, cause a computing device to:
receive a sequence of samples of an RF signal transmitted between a drone and a controller, the RF signal including a synchronization signal for synchronization of the RF signal;
obtain a double differential of the received sequence of samples;
calculate a running sum of a defined number of the double differential of the received sequence of samples;
detect the presence of the drone based on the running sum;
synchronize with the RF signal based on the running sum;
determine a metric based on the running sum, wherein the metric is determined according to the following equation:

$$\gamma_{fd2}[k] \triangleq \sum_{k=2}^{P-1} Y^{dd}[k],$$

wherein $Y_{fd2}[k]$ is the metric, $Y^{dd}[k]$ is the double differential, and $P$ is a length of the synchronization signal; and
determine that the metric is greater than a threshold value,
wherein the detecting of the presence of the drone is further based on the determination that the metric is greater than the threshold value.

16. The non-transitory computer readable storage medium of claim 15, wherein the synchronization signal comprises a frequency domain sequence including guard bands.

* * * * *

UNITED STATES PATENT AND TRADEMARK OFFICE
CERTIFICATE OF CORRECTION

PATENT NO. : 11,442,141 B2
APPLICATION NO. : 16/871713
DATED : September 13, 2022
INVENTOR(S) : Chun Kin Au Yeung It is certified that error appears in the above-identified patent and that said Letters Patent is hereby corrected as shown below:

On the Title Page

Page 2, Column 2, Line 54, Delete "Know1." and insert -- Knowl. --.

In the Specification

Column 8, Line 6 (Approx.), Delete "y[n]=hs[n]exp(jΔθn)+w[n]" and insert -- y[n]=hs[n]exp(jΔθn)+w[n], --.

Column 9, Line 7 (Approx.), Delete "$s^{dd}[n] \triangleq s^d[n](s^d[n-1])^H$" and insert -- $s^{dd}[n] \triangleq s^d[n](s^d[n-1])^H$, --.

Column 9, Line 24 (Approx.), Delete "$\overline{w}^{dd}[n]$" and insert -- $\overline{\overline{w}}^{dd}[n]$ --.

Column 9, Line 25 (Approx.), Delete "$\overline{w}^{dd}[n]$" and insert -- $\overline{\overline{w}}^{dd}[n]$ --.

Column 9, Line 26 (Approx.), Delete "$\overline{w_d}[n]$" and insert -- $\overline{w}^d[n]$ --.

Column 9, Line 26 (Approx.), Delete "hd[n]" and insert -- hs[n] --.

Column 9, Line 27 (Approx.), Delete "$\exp(-j\Delta_\theta)x_u^d[n](\overline{w}^d[n-1]$" and insert -- $\exp(-j\Delta_\theta(n-1))w[n]$ --.

Column 9, Line 29-30 (Approx.), Delete "$\overline{\overline{w}}^{dd}[n] \triangleq \overline{w}^{dd}[n]+|h|^2 \exp(j\Delta_\theta)x_u^d[n](\overline{w}^d[n-1])^H+|h|^2\exp(-j\Delta_\theta)(x_u^d[n-1])^H\overline{w}^d[n]$," and insert Signed and Sealed this
Fourteenth Day of March, 2023

*Katherine Kelly Vidal*
Katherine Kelly Vidal
*Director of the United States Patent and Trademark Office*

CERTIFICATE OF CORRECTION (continued)
U.S. Pat. No. 11,442,141 B2

Page 2 of 2

$$\overline{w}^{dd}[n] \triangleq \overline{w}^{dd}[n] + |h|^2 \exp(j\Delta_\theta) x_u^d[n]($$
$$\overline{w}^d[n-1])^H + |h|^2 \exp(-j\Delta_\theta)(x_u^d[n-1])^H \overline{w}^d[n], --.$$

Column 9, Line 39 (Approx.), Delete "$\gamma^{dd}$" and insert -- $y^{dd}$ --.

Column 9, Line 58, Delete "[0;" and insert -- (0; --.

Column 10, Line 22 (Approx.), Delete "L" and insert -- $\angle$ --.

Column 10, Line 65, Delete "$\mathcal{F}[0]$," and insert -- $\mathcal{F}\{x_u\}[0]$ --.

Column 10, Line 67 (Approx.), Delete "$\mathcal{F}^{-1}\{x_u\}[n]=x_u^H[u^{-1}n-1]\mathcal{F}^{-1}\{x_u\}[0]$," and insert -- $\mathcal{F}^{-1}\{x_u\}[n]=x_u^H[u^{-1}n-1]\mathcal{F}^{-1}\{x_u\}[0]$, --.

Column 11, Line 11 (Approx.), Delete "$[n]\mathcal{F}^{-1}$" and insert -- $[n] = \mathcal{F}^{-1}$ --.

Column 12, Line 19, Delete "$Y_{fd2}[k]$, $Y^{dd}[k]$" and insert -- $Y^d[k]$, $Y^{dd}[k]$, --.

Column 12, Line 24 (Approx.), Delete "$\overline{W}^d[k]$." and insert -- $\overline{W}^d[k]$, --.

In the Claims

Column 15, Line 63, In Claim 1, delete "$Y_{fd2}[k]$" and insert -- $\gamma_{fd2}[k]$ --.

Column 16, Line 58, In Claim 9, delete "$Y_{fd2}[k]$" and insert -- $\gamma_{fd2}[k]$ --.

Column 18, Line 15 (Approx.), In Claim 15, delete "$Y_{fd2}[k]$" and insert -- $\gamma_{fd2}[k]$ --.